United States Patent [19]

Harris

[11] Patent Number: 5,070,751
[45] Date of Patent: Dec. 10, 1991

[54] APPARATUS FOR DETECTING LATERAL DEVIATION OF A BAND SAW BLADE

[76] Inventor: Gerald R. Harris, P.O. Box 1148, Pryor, Okla. 74362

[21] Appl. No.: 640,156

[22] Filed: Jan. 11, 1991

[51] Int. Cl.$^5$ .............................................. B23D 55/08
[52] U.S. Cl. .......................................... 83/62.1; 83/820
[58] Field of Search ................... 83/62, 62.1, 820, 72, 83/74, 789, 802

[56] References Cited

U.S. PATENT DOCUMENTS

| | | | |
|---|---|---|---|
| 2,602,987 | 7/1952 | Wells . | |
| 4,237,757 | 12/1980 | Bonac | 83/820 X |
| 4,289,053 | 9/1981 | Sawamura | 83/62.1 |
| 4,336,731 | 6/1982 | Eklund | 83/820 X |
| 4,355,555 | 10/1982 | Kobayashi et al. | 83/62.1 |
| 4,557,168 | 12/1985 | Tokiwa | 83/62.1 X |
| 4,674,374 | 6/1987 | Sadahiro et al. | 83/62.1 |

Primary Examiner—Frank T. Yost
Assistant Examiner—Rinaldi Rada
Attorney, Agent, or Firm—Flehr, Hohbach, Test, Albritton & Herbert

[57] ABSTRACT

An apparatus (50) for detecting lateral deviation of a band saw blade (36) from the desired line of cut which includes an angularly displaceable element (54) slidably engaging the saw blade (36) for pivotal movement therewith. A relatively rigid mounting assembly (52,64) mounts the angularly displaceable element (54) for rotation while resisting lateral displacement. Lateral blade deviation is proportionately determined when angular displacement is sensed by a sensor (55) as the blade (36) contacts the displaceable element (54) rotating it about an axis (53) through the desired plane of the blade (36). The angular deflection sensing assembly 50 also may be incorporated into a guide arm (32).

16 Claims, 8 Drawing Sheets

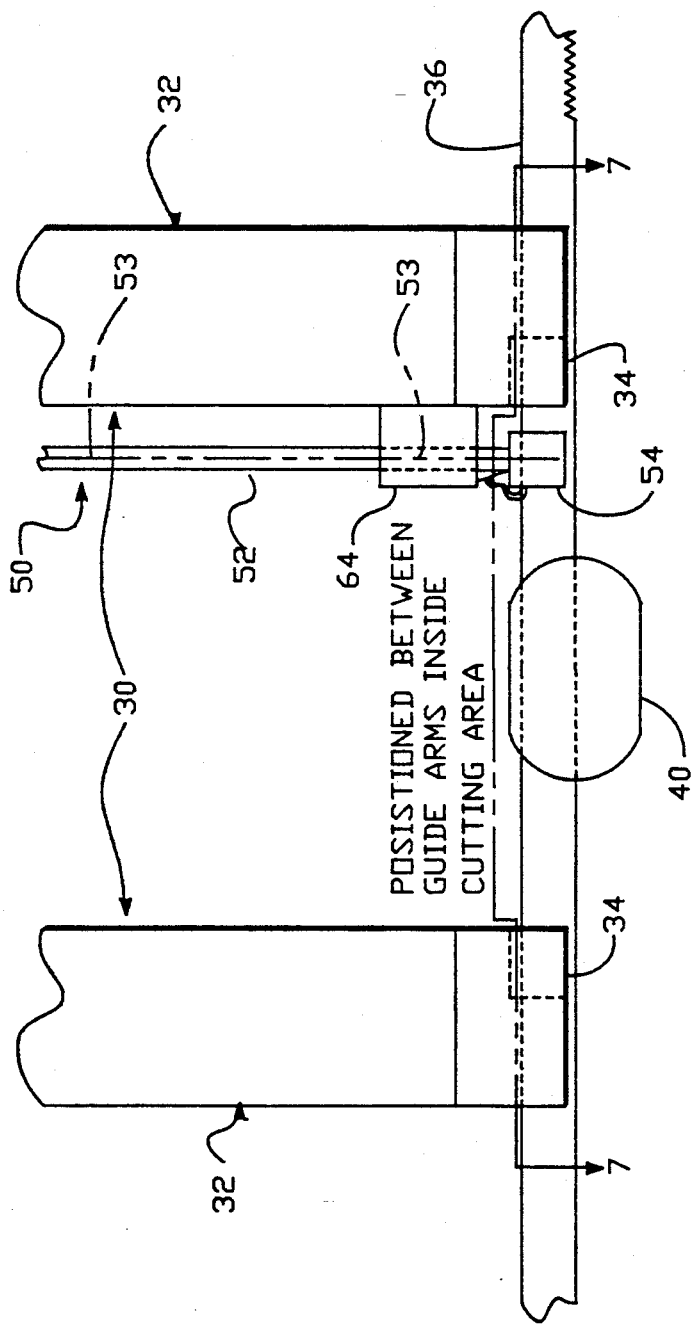
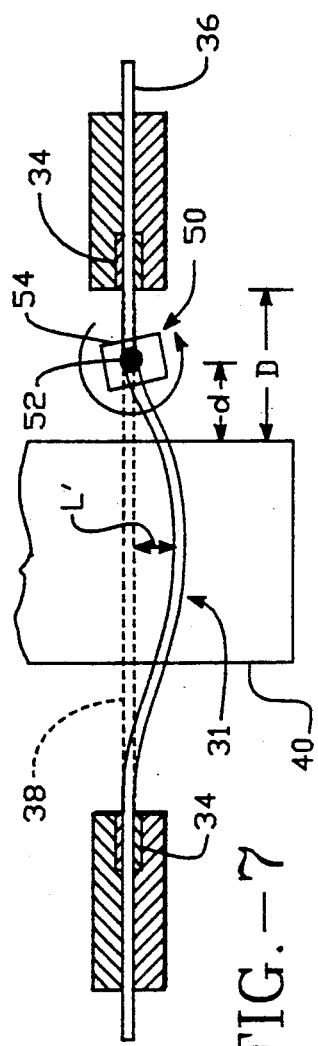
FIG.-6
FIG.-7

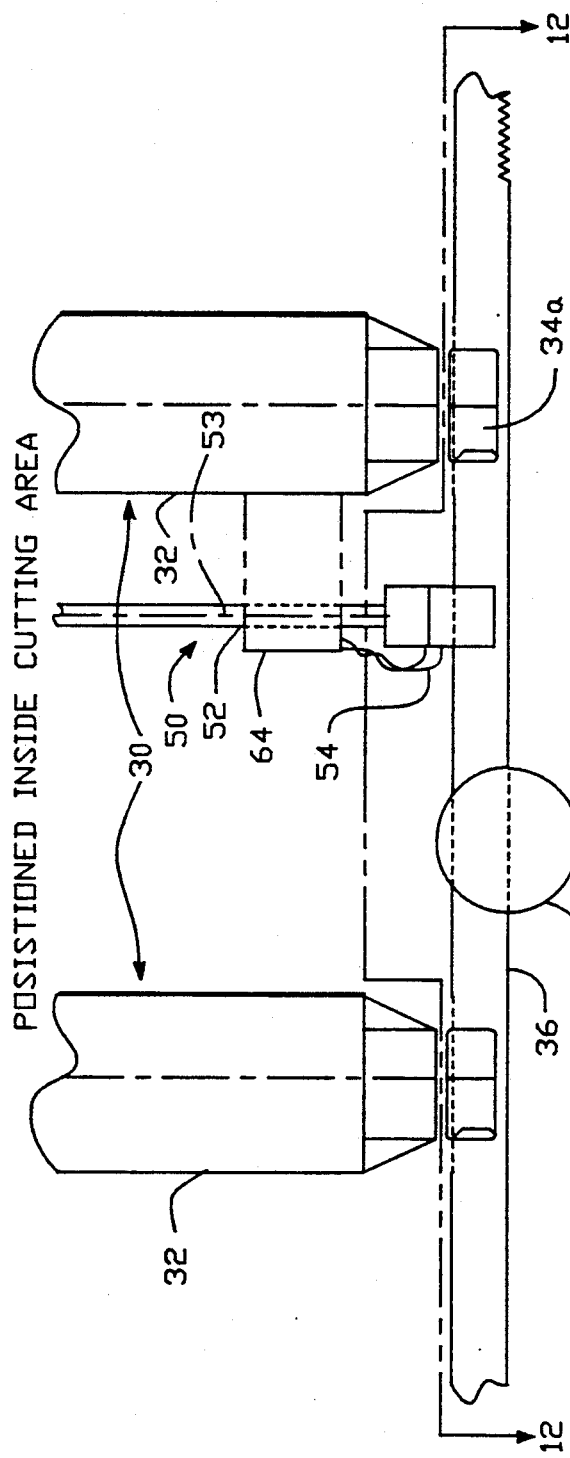
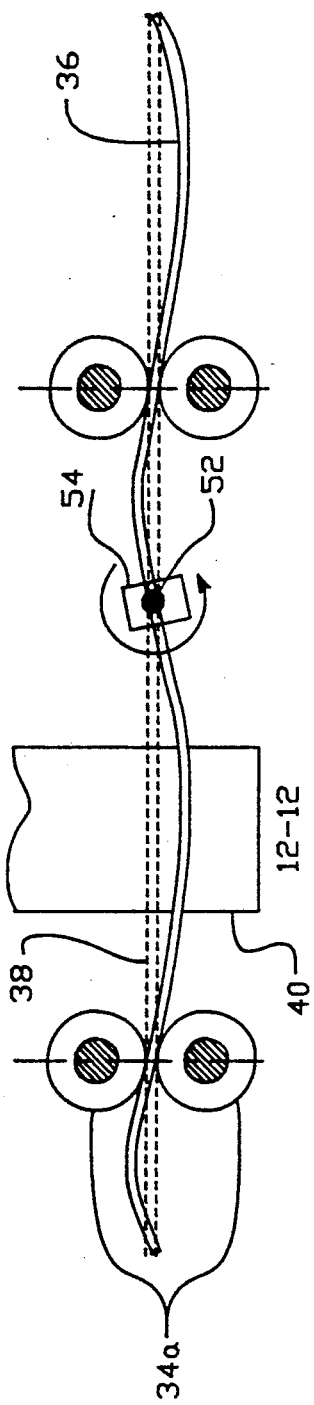

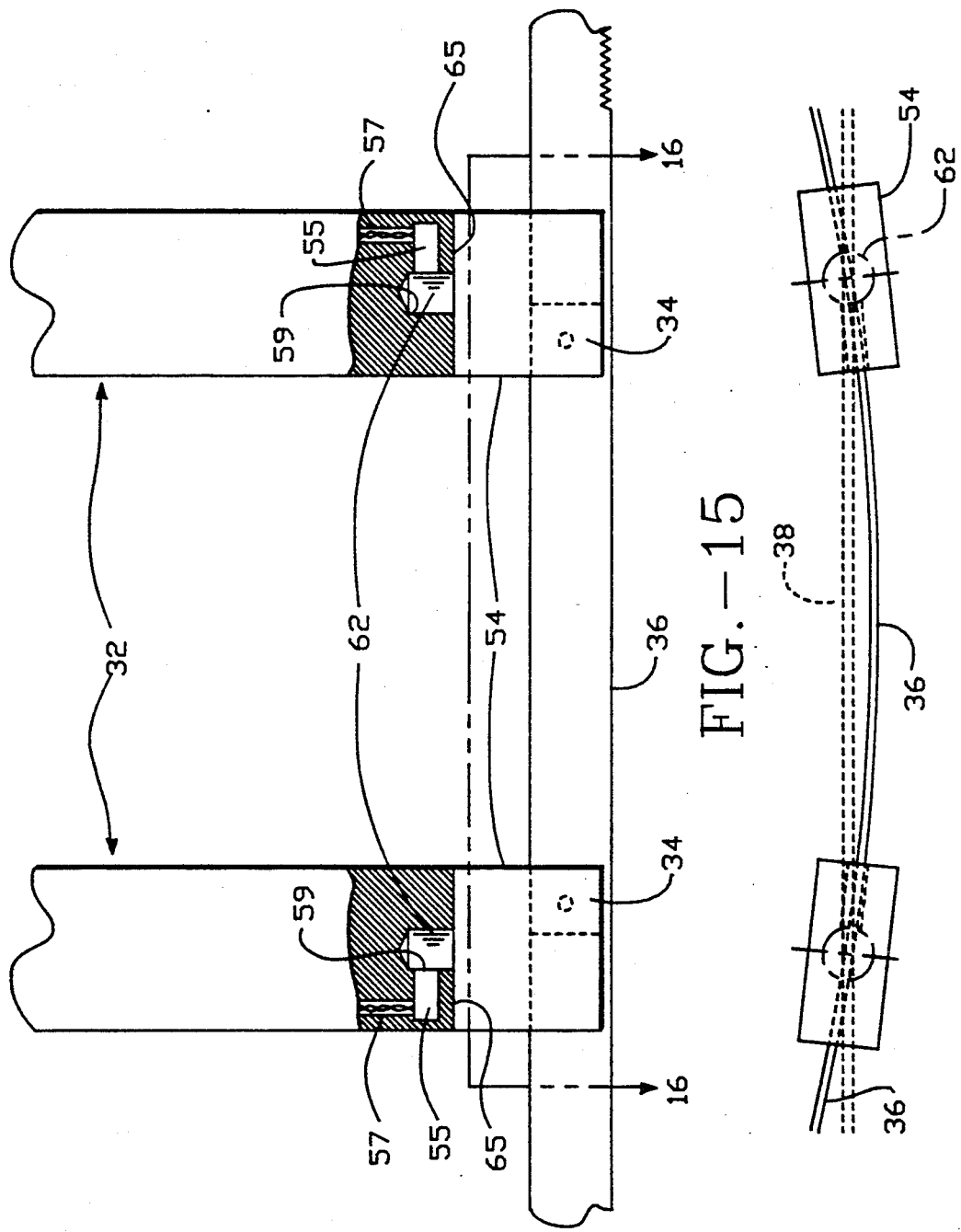

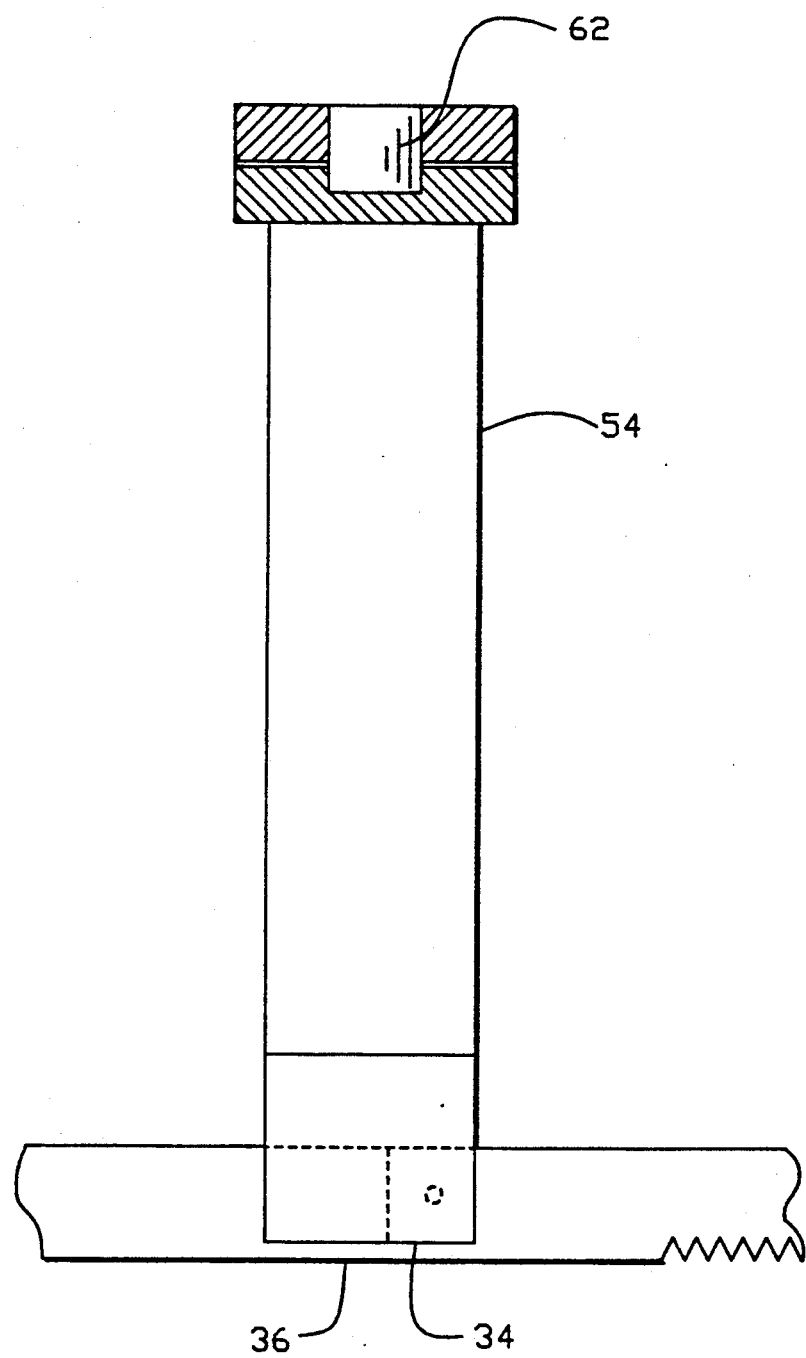
FIG.—17

APPARATUS FOR DETECTING LATERAL DEVIATION OF A BAND SAW BLADE

TECHNICAL FIELD

The present invention relates, in general, to band saw apparatus which utilize a rotating continuous loop saw blade for cutting relatively hard metal workpieces and, more particularly, relates to band saw apparatus having devices for detecting and measuring lateral deviations of the band saw blade from the desired line of cut.

BACKGROUND OF THE INVENTION

As is commonly known, conventional band saw apparatus include a base fixture on which workpieces to be cut are placed and a saw head assembly which houses a flexible continuous loop saw blade. The band saw blade is mounted around a pair of wheels or pulleys, one of which is driven. Typically, two or more blade guide assemblies are mounted to the head assembly between the wheels or pulleys, which guide assemblies slidably engage the saw blade to orient it in a generally vertical cutting orientation. The section of the saw blade intermediate the saw blade guide assemblies is called the "cutting stretch." The saw blade and the workpiece are displaced relative to one another so that the saw blade contacts and cuts the workpiece at the saw blade cutting stretch. More advanced band saw apparatus head assemblies are so arranged as to be lowered and raised toward and away from the base by a suitable means, such as a hydraulic motor or pneumatically. Movement of the head assembly is often achieved by either being pivotal around a hinge pin or translational along appropriate vertical or horizontal guide posts. Thus, in cutting operations, the saw head assembly is moved toward the base so as to enable the driven band saw blade to cut the workpiece which has been placed on the base.

In recent years, considerable effort has been directed toward enhancing the cutting efficiency and precision of band saws when cutting hard metallic workpieces or the like. One problem often encountered with conventional band saw apparatus is lateral blade deviation from the desired line of cut. Such deviations of the band saw blade adversely affect cutting precision and accuracy, which in extreme cases necessitate scrapping of the workpiece. In other instances, excessive materials are wasted because cutting imprecision is allowed for by increasing the workpiece length. For example, when a square end is desired, the material length of the workpiece will purposely be increased so that the crooked end may be milled or machined down to the proper shape and size. Furthermore, such deviation can result in excessive wear and stress on the blade, thereby, shortening the expectancy of blade life. Ultimately, manufacturing costs are substantially increased.

As stated, two or more movable blade guide assemblies are employed intermediate the blade drive and idler wheels. Generally, the guide assemblies are situated as close as possible to the edges of the workpiece to laterally stabilize the blade against transverse deflection as it cuts through the workpiece. Still, for difficult to cut metals and/or high feed rates, the blade may tend to wonder or move laterally from the desired or nominal line of cut to be made on the workpiece. Factors, such as uneven blade sharpness, also adversely affect blade deviation. Thus, operator knowledge of even the slightest deflection of the blade during operation is quite beneficial in avoiding the rejection of parts and permitting operational adjustments to compensate for deviation.

Since most lateral deviations of the band saw blade cannot be readily noticed by operators during cutting operations, the cutting imprecision will not detected until the operation is completed and the workpiece inspected. For this reason, there has been a great need to immediately and automatically detect the lateral deviation of a band saw blade. Detection devices have been developed which provide a means for detecting and thereafter manually or automatically controlling band saw operating parameters which contribute to the cutting imprecision by varying, for example, the blade speed or feed rate, before irreparable damage is done to the workpiece.

One prior art blade deviation detection approach is to provide a detecting apparatus between the guide assembly and the workpiece which slidingly engages a side of the saw blade and detects any deflection between the exit of the guide assembly and the edge of the workpiece. Typical of such a system is the apparatus set forth in U.S Pat. Nos. 4,289,053. In this patent an endless band saw blade is formed with a deflection detection apparatus placed between the guide assembly and the edge of the workpiece. A rockable detecting arm is pivotally mounted about a hingepin with one end yieldably urged onto slidable contact with one side of the saw blade. Thus, the detecting arm moves pivotally about the hingepin in a vertical plane perpendicular to the blade travel in response to lateral deviation of the blade. The upper end of the detecting arm contacts a bell crank member hinged in movable communication with the detecting arm. This, in turn, urges a damped pushrod which cooperates with circuitry and control devices responsive to such pushrod movement to measure the lateral deviation of the band saw blade.

Another approach for measuring the lateral deviation of a band saw blade is disclosed in U.S. Pat. No. 4,355,555. This approach employs a system substantially similar to the prior art described in the preceding paragraph. In this instance, a rockable lever arm is pivotally mounted about a hinge pin proximate the lever arm midpoint. The lower end is yieldably urged in slidable contact against one side of the saw blade while the upper end is rigidly mounted to a pushrod situated at substantially a right angle. As the yieldable end detects lateral deviation, the pushrod moves in pivotal correspondence forcibly contacting a second rockable lever arm at a substantially right angle and parallel to the first rockable lever arm. The pivotal movement of a chip member, disposed atop of the second rockable arm, is sensed by circuitry designed to observe the angular displacement of the chip and, thus, lateral movement of the saw blade.

While such prior art blade deflection sensing devices are able to effectively detect lateral deflection of a band saw blade, often measuring the deviation at a fixed point may misrepresent the actual maximum deflection of the band saw blade in the cutting stretch. Turning now to FIGS. 1, 2 and 3, a prior art blade deflection sensor is schematically represented. Typically, the lateral deviation detecting apparatus is placed between the guide assemblies, generally designated 10, which define the cutting stretch. As shown, lever arm 12 is yieldably biased toward band saw blade 14 at contact tab 18 and is pivotally mounted for displacement about hingepin 16. Thus, by directly measuring the rotational motion of lever arm 12 which relatively freely pivots, the deflection or angular displacement of blade 14 from the desired line of cut is proportionately determined.

The prior art set forth above effectively detects lateral deviation when displacement occurs as viewed in FIG. 2. However, when periodic waves develop between the cutting stretch, as schematically represented in FIG. 5, the system may yield erroneous conclusions. In systems employing roller guides 20, such as U.S. Pat. No. 2,602,987 to Wells, rather than slidable guide elements, sinusoidal waves can form in the blade during the cutting operation as a result of blade sharpness differences and hardness differences. As viewed in FIG. 5, contact tab point 18 lies directly or substantially near nodal point 22 of the periodic wave in blade 14. At nodal point 22, saw blade 14 intersects the desired line of cut 24 whereby little or no displacement is sensed. Accordingly, the operator or the automatic control system is misled as to the accuracy of the cutting operation.

Moreover, the blade deflection sensing prior art discussed above does not itself promote blade guidance; they merely sense and measure it. Referring back to the prior art detecting apparatus represented in FIGS. 1-5, lever arm 12 freely displaces laterally when blade 14 deviates. Thus, arm 12 does not provide any lateral rigidity to the blade.

While the prior devices have been satisfactory for many applications, it is highly desirable to provide an assembly capable of measuring or detecting the slightest deviation from the desired line of cut while simultaneously reducing blade displacement between the cutting stretch.

Accordingly, it is an object of the present invention to provide a band saw blade deflection measuring apparatus for detecting deviations of the band saw blade from the desired line of cut which also resists lateral blade deflection during cutting.

It is another object of the present invention to provide an improved apparatus for measuring lateral deviation of band saw blades by measuring the rotational displacement of the saw blade.

It is yet another object of the present invention to provide a band saw deflection measuring apparatus which provides lateral rigidity to the measuring apparatus while retaining rotational measuring capabilities.

It is a further object of the present invention to provide an band saw apparatus measuring deflection which is durable, compact, easy to maintain, has a minimum number of components and is economical to manufacture.

The apparatus of the present invention has other objects and features of advantage which will become apparent from and are set forth in more detail in the description of the Best Mode of Carrying Out the Invention and the accompanying drawing.

DISCLOSURE OF INVENTION

In summary, the blade deviation detecting apparatus of the present invention is particularly suitable for use with vertical or horizontally mounted band saw machines employed for commercial or industrial use. The band saw apparatus used in conjunction with the present invention includes: a blade drive assembly formed for support and guided movement of a movable carriage, a pair of rotatable blade drive wheels mounted to the carriage, and a continuous band saw blade is mounted to the drive wheels. A feed assembly is coupled for controlled advancement of the carriage toward a workpiece. In one aspect, the improvement in the band saw apparatus designed in accordance with the present invention comprises, briefly, an angularly displaceable element slidably engaging the saw blade and responsive to any angular displacement of the blade. Mounting the displaceable element for rotation about a vertical axis which passes through the desired line of cut is a mounting assembly. As the displaceable element rotates about the vertical axis, angular displacement of the blade is sensed by a sensor. Maximum lateral deviation of the blade can be proportionately determined from this sensed angular deviation. The mounting assembly for the displaceable element does not impede angular displacement about the pivotal axis but it does resist lateral deviation by providing lateral rigidity to the band saw blade. Lateral blade deviation is curtailed in part by the relative rigidity of the deflection sensor, which is held on the desired line of cut at a position close to the workpiece during cutting.

The blade deviation detection apparatus constructed in accordance with the present invention will be described in more detail below in conjunction with the accompanying drawing.

BRIEF DESCRIPTION OF THE DRAWING

Additional objects and features of the invention will be more readily apparent from the following detailed description and appended claims when taken in conjunction with the drawing, in which:

FIG. 6 is a fragmentary, front elevational view of a band saw apparatus employing an angularly displaceable blade deviation detection assembly of the present invention positioned inside the cutting stretch.

FIG. 7 is a fragmentary, cross-sectional, top plan view taken substantially along the plane of line 7—7 in FIG. 6.

FIG. 11 is a fragmentary, front elevational view of a band saw apparatus having guide assemblies with rollers employing an angularly displaceable blade deviation detection assembly of the present invention positioned inside the cutting stretch.

FIG. 12 is a fragmentary, cross-sectional, top plan view taken substantially along the plane of line 12—12 in FIG. 11.

FIG. 15 is an enlarged, fragmentary, cross-sectional, front elevational view of an alternative embodiment of the blade deviation detection assembly of the present invention.

FIG. 16 is an enlarged, cross-sectional, top plan view taken substantially along the plane of line 16—16 in FIG. 15.

FIG. 17 is a fragmentary, cross-sectional, front elevational view of still another alternative embodiment of a blade deviation detecting assembly constructed in accordance with the present invention.

BEST MODE FOR CARRYING OUT THE INVENTION

Figure 1:
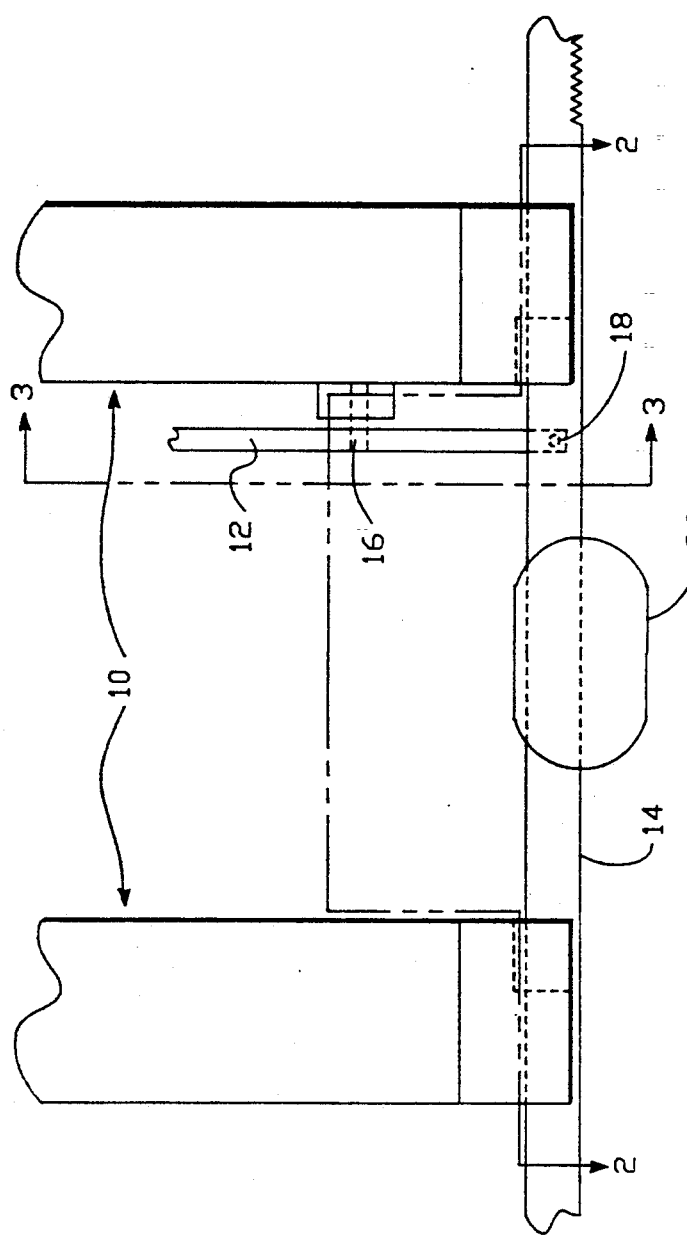
FIG. 1 is a fragmentary, front elevational view of a prior art band saw apparatus having a hinged lever arm lateral deviation detection apparatus positioned inside the cutting stretch.
Figure 3:
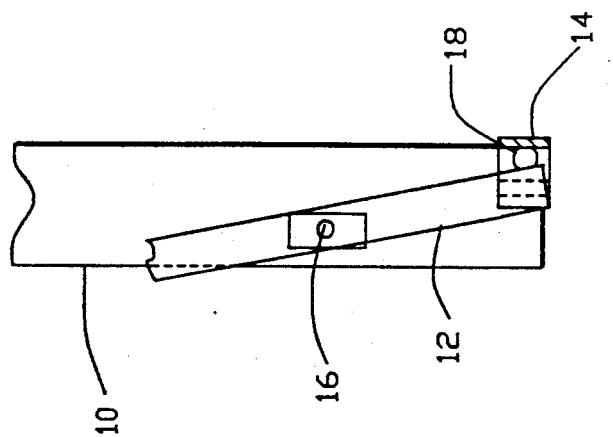
FIG. 3 is a fragmentary, side elevational view in cross section of the prior art band saw apparatus taken substantially along the plane of line 3—3 in FIG. 1 and employing the pivotally mounted detecting lever arm.

Reference will now be made in detail to the preferred embodiments of the invention, examples of which are illustrated in the accompanying drawings. While the present invention has been described with reference to a few specific embodiments, the description is illustrative of the invention and is not to be construed as limiting the invention. Similarly, although primarily designed to detect lateral deviation on horizontal and vertical band saw apparatus having guide assemblies, the present invention is applicable to any suitable type of band saw machine. Various modifications may occur to those skilled in the art without departing from the true spirit and scope of the invention as defined by the appended claims.

Turning now to the drawings, wherein like components are designated by like reference numerals throughout the various figures, attention is directed to FIGS. 6 and 7. Here is provided a band saw apparatus having two guide assemblies, generally designated 30, and a blade deviation detection apparatus of the present invention, generally designated 50. The typical band saw apparatus having guide assemblies 30 is well known in the art and is, thus, only partially represented for the purposes of describing the present invention.

As illustrated, a cutting stretch 31 extends between elongated downwardly extending guide arms 32, which are mounted to a carriage structure (not shown) at their upper ends. One or more of saw blade guide assemblies 30 may be adjusted along the blade path to permit adjustment of the length of the saw blade cutting stretch to position arms 32 in close proximity to the sides of workpiece 40. Guide arms 32 have guide elements 34 removably secured at their lower ends, which elements provide planar bearing surfaces, which slidably engage and align band saw blade 36 in a vertical orientation coinciding with a vertical plane passing between the cutting stretch. Accordingly, band saw blade 36, when not deflected, is vertically aligned along a desired line of cut 38. As will be discussed below in more detail, and as illustrated in FIGS. 11-14, guide elements 34 may also comprise guide rollers which are commonly known in the field. However, for the purposes of describing the present invention, reference will be made to the slidable guide elements 34 best shown in FIGS. 6 and 7. Here, guide elements 34 are preferably carbide and are formed for slidable engagement of the planar bearing surface against the smooth opposing flat sides of saw blade 36. The purpose of guide assemblies 30 is to reduce deflection or meandering of saw blade 36 in cutting stretch 31 and to maintain the blade along its proper course.

However, as stated, blade deflection is also a function of blade stiffness, feed rate and blade speed. Many other factor affect deflection, including the type of blade used, sharpness of the blade, rigidity of the machine and blade hardness of the material, and the configuration of the workpiece. Thus, even when guide assemblies 30 are functioning properly, lateral deviation of the blade often occurs, and adjustments to the band saw system to minimize such deviation must be made. Accordingly, detecting band saw blade deviation is an integral part of achieving cutting precision.

Figure 8:
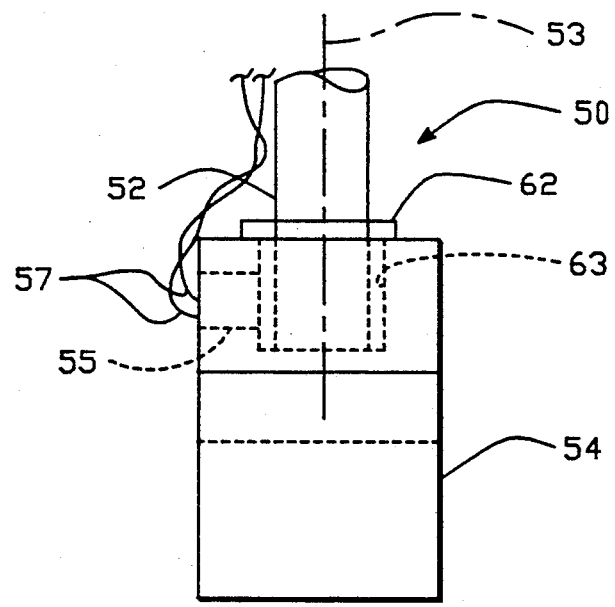
FIG. 8 is an enlarged, fragmentary, front elevational view of the blade deviation detecting assembly constructed in accordance with the present invention.

In the embodiment shown in FIGS. 6-12, blade deviation detection assembly 50 is constructed with an elongated rod member 52 which extends downwardly along a vertical axis 53 which passes through desired line of cut 38. FIG. 8 illustrates that an angularly displaceable element 54 is mounted for pivotal movement about vertical rod member 52 and axis 53. Vertical axis 53, in turn, passes through the plane of line of cut 38, as best shown in FIGS. 7 and 12. Angularly displaceable element 54 is receptive to any angular displacement of saw blade 36 by slidingly engaging or straddling the blade along its planar smooth blade surface in a manner similar to slidable guide elements 34. Thus, even when circumstances are such that a blade nodal point coincides with the location of rotation element 54, as discussed above, the angular displacement of blade 36 can still accurately be measured using the blade detection system of the present invention. FIG. 12 clearly shows this capability. This capability is not present in prior art systems.

Moreover and very importantly, the blade deviation detection assembly of the present invention preferably includes mounting means, such as mounting bracket 64 which relatively, rigidly secures rod member 52 vertically in the same plane as the blade plane cutting stretch to thereby resist and reduce lateral blade deviation. This concept is best understood by comparing the prior art, as viewed in FIG. 2, with the present invention, as illustrated in FIG. 7. In this comparison, all other band saw components are assumed to be the same except for the blade deviation detecting assemblies. Furthermore, assuming that all relevant blade deviation factors are equivalent, (i.e., blade speed, feed, workpiece configuration and cutting stretch length) especially the distance between the edge of the workpiece and the point of contact of the detection assembly with the band saw blade, maximum blade deviation L' using the present invention is reduced from maximum deviation L using the prior art apparatus.

Figure 2:
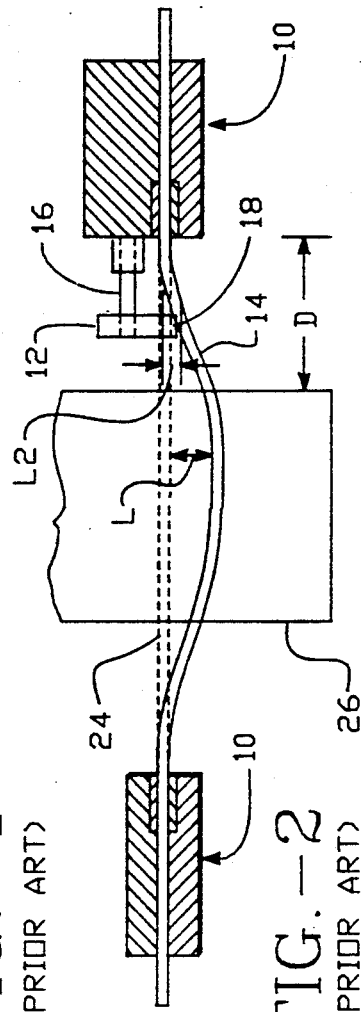
FIG. 2 is a fragmentary, top plan view in cross section, taken substantially along the plane of line 2—2 in FIG. 1, of the prior art band saw apparatus of FIG. 1, showing the lateral deflection of the band saw blade.
Figure 4:
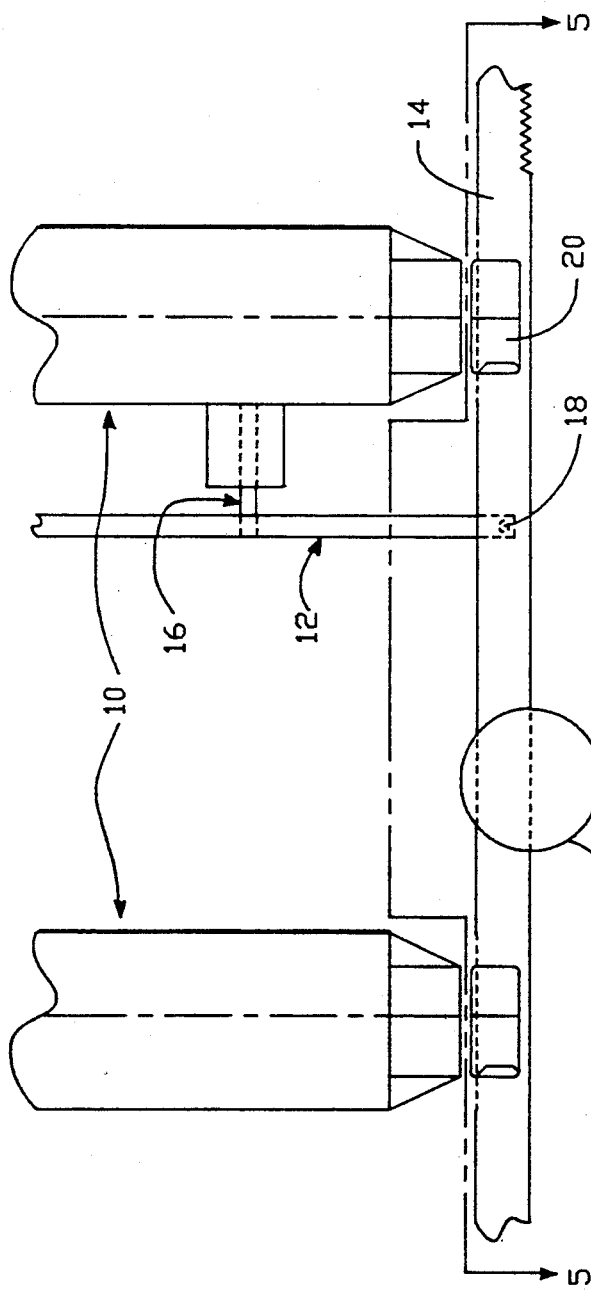
FIG. 4 is a fragmentary, front elevational view of prior art band saw apparatus having a hinged lever arm lateral deviation detection apparatus positioned inside the cutting stretch and employing roller guide assemblies for blade guidance.
Figure 5:
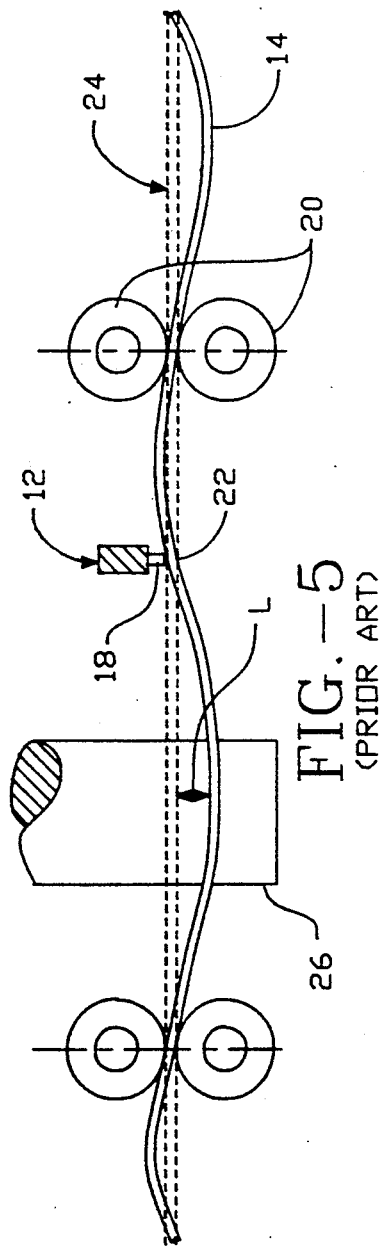
FIG. 5 is a fragmentary, top plan view in cross section, taken substantially along the plane of line 5—5 in FIG. 4, of the prior art band saw apparatus of FIG. 4, showing the periodic lateral deflection of the band saw blade.

Referring to the prior art shown in FIG. 2, lever arm 12 slidably contacts blade 14 at contact tab point 18 and determines the blade lateral deviation distance L2. With this distance, maximum deflection, L, may then be proportionately calculated. The prior art apparatus, however, provides no lateral rigidity to blade 14 itself and, in fact, because the apparatus is positioned between the guide arm 10 and workpiece 26, it increases the likelihood of lateral deviation by increasing the distance between one guide arm and the workpiece. In other words, the prior art detection assembly adversely influences the lateral deviation of the blade.

By comparison, the apparatus of the present invention mounts rod member 52 on a vertical axis in the same vertical plane which contains the specified line of cut 38. While angularly displaceable member 54 can rotate to sense blade deflection, mounting bracket 64 resists lateral displacement. Thus, in the present invention, the displacement of one of arms 32 away from a side of workpiece 40 to accommodate a deflection sensing apparatus is made up for at least in part by the ability to hold the sensor on the desired line of cut. This is particularly noticeable in FIG. 7, where detecting assembly 50 is situated between guide assemblies 30 reducing this distance to D-d. All distances have been increased for ease of illustration, and it will be understood that the guide arms and deflecting apparatus preferably are positioned immediately adjacent to the sides of the workpiece in actual use. Accordingly, the cutting stretch may be effectively reduced because detecting assembly 50 adds lateral rigidity to band saw blade 36 which is similar to the stability provided by guide arms 32. Essentially, more accurate blade guidance and greater cutting precision is attained. Moreover, this assembly, while providing lateral rigidity to band saw blade 36, still measures angular displacement of the blade through the cutting stretch.

Figure 9:
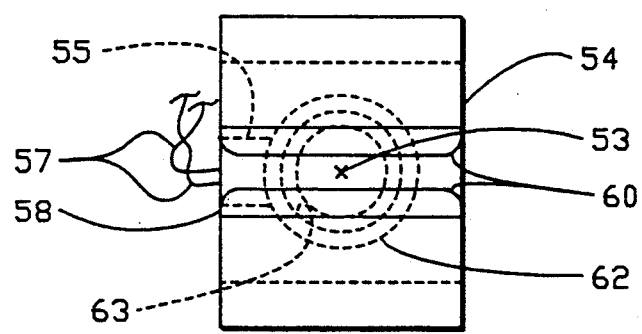
FIG. 9 is a bottom plan view of the blade deviation detecting assembly of FIG. 8.
Figure 10:
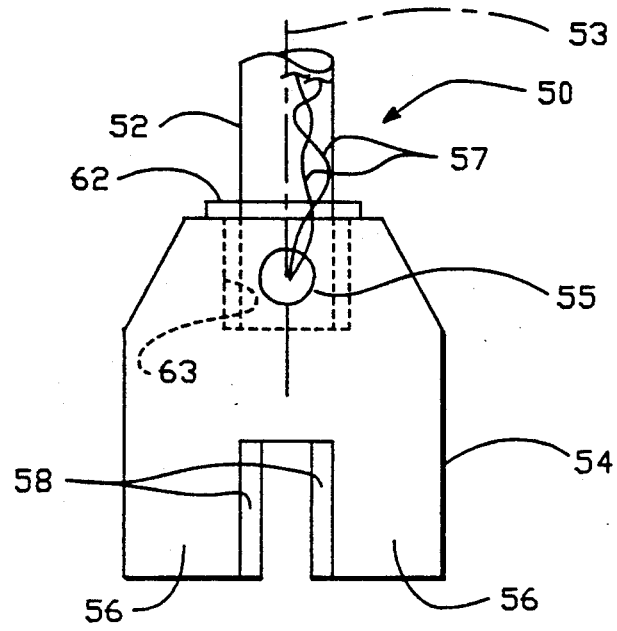
FIG. 10 is an end elevational view of the blade deviation detecting assembly of FIG. 8.

As best illustrated in FIGS. 8-10, detection apparatus 50 includes angularly displaceable element 54 which is comprised of a rectangular parallelpiped solid having a longitudinal channel therethrough defining lobes members 56. This bifurcated shape straddles band saw blade 36 slidably engaging the two opposing smooth sides of the blade. Rectangular contact inserts 58 may be disposed therebetween as shown in FIGS. 9 and 10. Saw blade 36 (not shown) travels lengthwise between the planar surfaces of inserts 58 slidably contacting the opposite sides of the blade thereby communicating any angular displacement from desired line of cut 38 to element 54. In the present invention, inserts 58 are preferably carbide; however, any other suitable material may be used. In addition, edges 60 of inserts 58, as viewed in FIG. 9, may be bevelled to facilitate slidable engagement with element 54 when blade 36 angularly displaces.

Means for rotation of element 54 about rod member 52 is provided by a pivotal joint 62, which is securely fixed to the distal end of rod member 52 and inset into a bored cylindrical aperture 63 centrally located atop rotational element 54. As clearly illustrated in FIGS. 8-10, joint 62 may be any one of a number of common pivotal joints well known in the art. These joints provide radial and longitudinal stability while simultaneously enabling rotational displacement. As such, angularly displaceable element 54 swivels about rod member 52, and lateral rigidity is maintained while freely enabling angular displacement.

Figure 14:
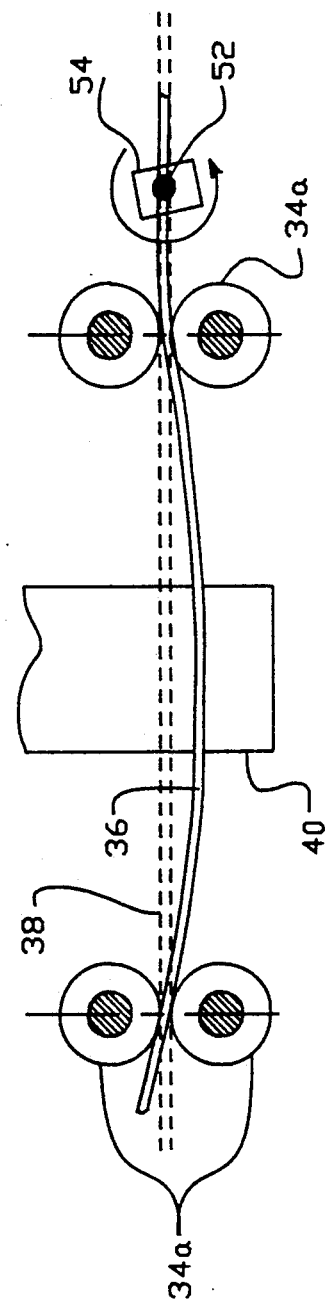
FIG. 14 is a fragmentary, cross-sectional, top plan view taken substantially along the plane of line 14—14 in FIG. 13.

From the above description, it will be understood that element 54 straddles blade 36 wherein inserts 58 contact the opposing planar sides of blade 36. Lobes 56 provide a rigid backing for inserts 58 such that blade 36 communicates all angular displacement efficiently. Accordingly, if band saw blade 36 deviates below desired line of cut 38, as illustrated in FIGS. 7 and 14, element 54 rotates counterclockwise in a horizontal plane about rod member 52, via, pivot joint 62. To the contrary, when band saw blade 36 deviates above the desired line of cut, element 54 rotates in a clockwise fashion.

In order to measure the angular displacement of band saw blade 36, sensing means 55 are employed to detect the degree of rotation of element 54 about rod member 52. Thus, as element 54 rotates about rod 52, the angular displacement of saw blade 36 can be sensed. Sensing apparatus 55 may be disposed in contact or integrally formed within joint 62 so as to be moved by the same. Typical of such devices include eddy current sensors, air pressure sensors, strain gauges, variable resistors, optical sensors, mechanical sensors or the like. It will be understood that these devices are not new and are commonly used in the field. Additionally, contact switches may be used as sensing means 55 for displaceable element 54. Sensor 55 may be coupled through conductors 57 to a saw controller (not shown).

The angular displacement-based deviation detection assembly 50 of the present invention may be placed at various locations along the band saw blade. In the preferred embodiment, detection assembly 50 is placed in one of three locations: between guide assemblies 30, just outside of one guide assembly 30 or integrated within one or both guide assemblies 30.

FIGS. 11-14 represent a band saw assembly employing roller guide elements 34a attached to the lower portion of guide arms 32. As previously viewed, roller guide elements 34a are not new to the field but are illustrated here to note the versatility of the present invention. Thus, FIGS. 11 and 12 disclose that guide assemblies 30, employing roller guide elements, may work in conjunction with detection assembly 50 located inside the cutting stretch just as efficiently as guide assemblies utilizing slidable guide elements. The present invention, as already noted, is particularly effective when a nodal point of a periodic deflection coincides with the location of detection assembly 50. As clearly viewed in FIG. 12, the placement of angularly displaceable element 54 coincides with the nodal point of blade 36. While prior art would fail to indicate blade deflection, the present invention would measure the angular displacement, and thus, the lateral deviation.

Figure 13:
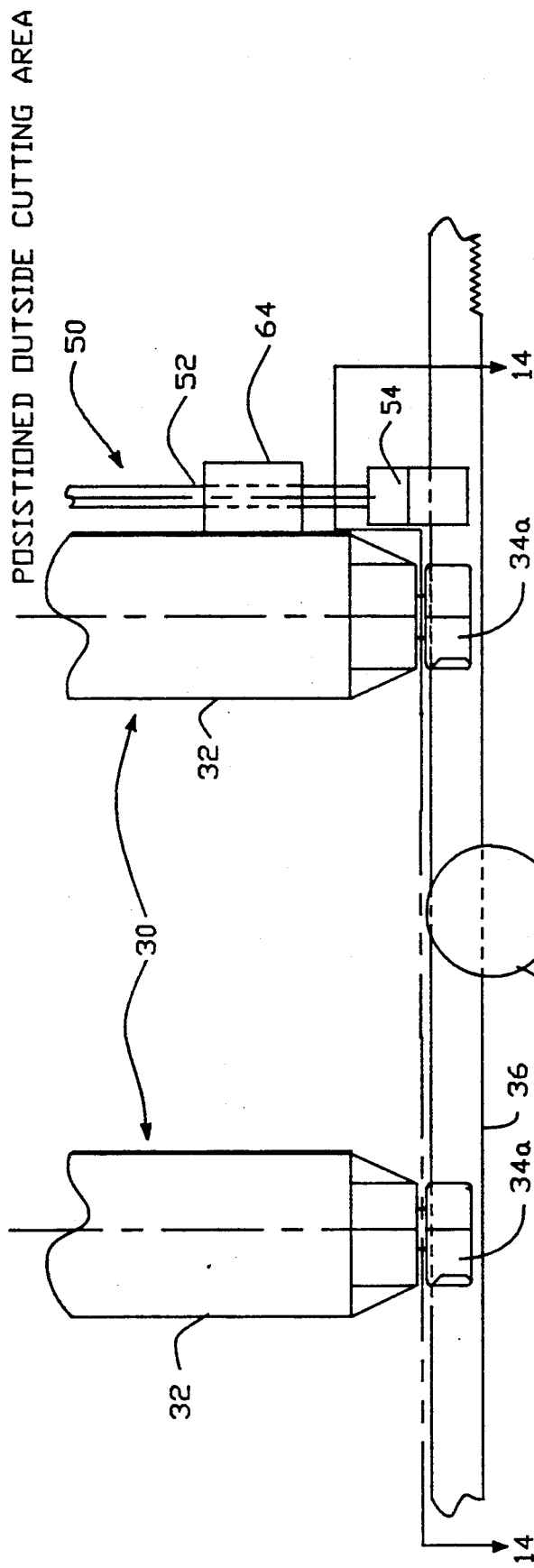
FIG. 13 is a fragmentary, front elevational view of a band saw apparatus having guide assemblies with rollers employing an angularly displaceable blade deviation detecting assembly of the present invention positioned outside the cutting stretch.

An alternative embodiment of the present invention is shown in FIGS. 13 and 14 whereby detecting assembly 50 is situated outside the cutting stretch. For the purposes of this disclosure, it will be understood that detecting assembly 50 may be placed upstream or downstream of the cutting stretch without adversely changing the effectiveness of the invention. Mounting of rod 52 to guide arm 32 outside the cutting stretch is similar to mounting it inside the stretch. As stated, bracket 64 may be any shape and longitudinally located at any position along rod member 52 as long as the axis of the rod intersects the desired line of cut. Lateral rigidity, as maintained, is provided to saw blade 36 at this point and is transmitted through rollers 34a to the cutting stretch. This concept is clearly viewed in FIGS. 13 and 14. In this configuration, roller guide elements 34a are preferable because slidable guide elements 34 would not communicate the true lateral displacement to a position outside the cutting stretch.

As can be seen in FIGS. 15 and 16, a guide assembly structure which is substantially similar to guide assemblies 30 illustrated in FIGS. 6 and 7. Here, guide arms 32 are jointed at 65 to provide angularly displaceable end elements 54 which are fully integrated into the lower portion of guide arms 32. In this embodiment, elements 54 carry slidable guide elements 34. The improvement comprises a rotational joint 62 mounted atop rotational element 54, as best shown in FIG. 15. It will be understood that pivotal joint 62 could just as easily been inset into rotational element 54 for the purposes of the present invention. In the preferred embodiment, however, pivotal joint 62 is centrally secured atop rotational element 54 and is inset into a cylindrically bored hole 59 at the distal end of guide arm 32. In this configuration, element 54 rotates in a horizontal plane about a longitudinal axis of guide arms 32 which is aligned to lie in the vertical plane passing through desired line of cut 38.

The assembly constructed in accordance with FIGS. 15 and 16 of the present invention enables both guide assemblies to be placed in closer proximity to the edges of the workpiece while still retaining lateral deflection measuring capabilities. Lateral stability is provided by downwardly extending vertical guide arms 32. These structures perform the dual role of blade guidance as well as blade deviation detection. Accordingly, guide arms 32 serve the same purpose as mounting rod member 52 of the previous configurations. As viewed in FIG. 15, guide arms 32 and rotational element 54 are exteriorly integrated. This concept is more aesthetically oriented and is not necessary to perform the principles of the present invention. Only one rotational element 54 need contain a sensor detecting rotation. It may, however, be beneficial to provide a dual sensing operation for safety reasons or for more accurate angular displacement measurements.

Lastly, FIG. 17 illustrates a further alternative configuration to the jointed guide arms as described above. As can be seen, FIG. 17 shows rotational or pivot joint 62 mounted to the upper end of guide arm 32. Thus, it will be understood that the improvement of the present invention may contain guide arms jointed anywhere along their longitudinal distance, containing a joint 64 therebetween, without departing from the true spirit of the invention.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein can be varied considerably with out departing from the basic principles of the invention.

What is claimed is:

1. An apparatus for the detection of lateral deviation of a band saw blade from a specified line of cut of a band saw machine as said band saw blade cuts through a workpiece, said apparatus including two guide assemblies located on opposite sides of and defining a cutting stretch, and detecting means mounted to said band saw machine proximate one of said guide assemblies for detecting said lateral deviation, wherein the improvement comprises:
    said detecting means including an angularly displaceable element, mounting means mounting said angularly displaceable element for rotation about a vertical axis through said specified line of cut in response to angular displacement of said blade, and sensing means mounted to and sensing rotational displacement of said angularly displaceable element to thereby detect lateral deviation of said blade in said cutting stretch.

2. The apparatus as defined in claim 1 wherein,
said detecting means contacts said blade at a position within said cutting stretch.

3. The apparatus as defined in claim 2 wherein,
said detecting means is located at a position proximate to one of said guide assemblies.

4. The apparatus as defined in claim 1 wherein,
said angularly displaceable element contacts said blade at a position within said cutting stretch.

5. The apparatus as defined in claim 1 wherein,
said mounting means resists lateral deflection of said axis from said specified line of cut.

6. The apparatus as defined in claim 1 wherein,
at least one of said guide assemblies transmits angular displacement of said blade along said blade to a position outside said cutting stretch, and
said detecting means contacts said blade at a position outside said cutting stretch to sense transmitted angular displacement.

7. The apparatus as defined in claim 1 wherein,
one of said guide assemblies includes a guide arm, and said angularly displaceable element is rotatably mounted to said guide arm by connecting means.

8. The apparatus as defined in claim 7 wherein,
said connecting means comprises a pivotal joint.

9. The apparatus as defined in claim 8 wherein,
said pivotal joint is positioned on a lower portion of said guide arm proximate said band saw blade.

10. The apparatus as defined in claim 8 wherein,
said pivotal joint is positioned on the upper portion of said guide arm remote of said band saw blade.

11. The apparatus as defined in claim 1 wherein,
said detecting means includes a strain gauge mounted for and detecting rotational displacement of said angularly displaceable element.

12. The apparatus as defined in claim 1 wherein,
said detecting means includes a variable resistor mounted for and detecting rotational displacement of said angularly displaceable element.

13. The apparatus as defined in claim 1 wherein,
said detecting means includes an optical sensor mounted for and detecting rotational displacement of said angularly displaceable element.

14. The apparatus as defined in claim 1 wherein,
said detecting means includes an eddy current sensor mounted for and detecting rotational displacement of said angularly displaceable element.

15. The apparatus as defined in claim 1 wherein,
said detecting means includes an air pressure sensor mounted for and detecting rotational displacement of said angularly displaceable element.

16. The apparatus as defined in claim 1 wherein,
said detecting means includes a set of mechanical contacts mounted for and detecting rotational displacement of said angularly displaceable element.

* * * * *